United States Patent [19]

Lutter, Jr.

[11] Patent Number: 6,106,072
[45] Date of Patent: Aug. 22, 2000

[54] SEQUENTIAL PIVOTING MECHANISM FOR SIDE DUMPING TRAILERS

[76] Inventor: Lloyd L. Lutter, Jr., 1725 S. Lake Port, Sioux City, Iowa 51106

[21] Appl. No.: 09/309,703

[22] Filed: May 11, 1999

[51] Int. Cl.[7] ....................................................... B60P 1/16
[52] U.S. Cl. ...................... 298/17.7; 298/17.5; 298/17.6; 298/18
[58] Field of Search ........................... 298/13, 17.5, 17.6, 298/17.7, 17.8, 18

[56] References Cited

U.S. PATENT DOCUMENTS

| | | | |
|---|---|---|---|
| 3,316,019 | 4/1967 | Flowers | 298/17.6 |
| 4,056,283 | 11/1977 | Pow | 298/17.6 |
| 4,200,334 | 4/1980 | Lindholm | 298/18 X |
| 4,289,353 | 9/1981 | Merritt | 298/17.5 |
| 4,494,798 | 1/1985 | Bailey | 298/17.6 |
| 5,480,214 | 1/1996 | Rogers | 298/17.6 |
| 5,597,211 | 1/1997 | Golden | 298/17.6 |
| 5,845,971 | 12/1998 | Rogers | 298/18 |
| 5,906,417 | 5/1999 | Golden | 298/17.6 |

*Primary Examiner*—Stephen T. Gordon

[57] ABSTRACT

A sequential pivoting mechanism for side dumping trailers, which allows the containment vessel to be initially pivoted upon a near point and subsequently pivoted upon a far point, while still allowing the containment vessel to be dumped to either side of the trailer frame. The mechanism comprises at least one forward and one rearward support beam of substantial length, which are affixed to the longitudinal members of the trailer frame. Atop of each support beam is secured an inwardly positioned pair of pivot pin receivers, and an outwardly positioned pair of pivot pin receivers secured on each side thereof. Each receiver has an associated pivot pin secured to the sidewalls of the containment vessel, positioned in a manner as to coincide with these receivers. Each inwardly positioned receiver is provided with a hydraulically-actuated, pivot pin locking and releasing device, which can be remotely controlled and are used to selectively release either the right or left side pivot pins to allow the containment vessel to be initially rotated to the side opposite that of the released pins, when the containment vessel is acted upon by extension of the lifting cylinders. The outwardly positioned receivers are also provided with a pivot pin locking and releasing device which when actuated by contact from their associated pivot pins, cause the inwardly positioned locking devices on the dumping side to be urged into the released position. This allows for the containment vessel to be subsequently pivoted upon a far point. Conversely, after the dumping operation is complete, retraction of the lift cylinders creates a lack of contact, which allows the inwardly positioned locking devices to be drawn over their associated pivot pins. The containment vessel is completely locked in the normal transport position as the lift cylinders become fully retracted and the hydraulic pressure is released from the orginally actuated inwardly positioned locking devices, thus allowing these locking devices to be drawn over their associated pivot pins.

5 Claims, 8 Drawing Sheets

SEQUENTIAL PIVOTING MECHANISM FOR SIDE DUMPING TRAILERS

BACKGROUND—FIELD OF INVENTION

This invention relates to side dump trailers and other containment vessel transporting vehicles which enable the contents thereof to be dumped from either side of the trailer. More particularly, to an improved pivoting mechanism for these vehicles.

BACKGROUND—DESCRIPTION OF THE PRIOR ART

Many different pivoting mechanisms have been proposed and used to enable trailer transported containment vessels to dump their loads in a specific manner.

Trailers have been used for many years to haul rock, gravel, dirt and other loose materials which are relatively heavy.

These trailers included such designs as the commonly used rear dump trailer, which includes a trailer dump body and an opening end gate for releasing the solid materials contained within the body. The forward end of the body is elevated by a hydraulic cylinder or the like in order to dump materials from within the trailer body.

The major disadvantage associated with such rear dump trailers is that the solid material, when dumped, may only be deposited directly behind the dumping trailer, thus severely restricting their usefulness and efficiency.

To overcome the problems and limitations encountered with the use of rear dump trailers, side dump trailers have been provided. These side dump trailers did allow solid materials to be dumped from the side of the trailer, rather than through the rear of the trailer, but the pivoting mechanisms of these trailers still include numerous deficiencies.

Rogers, U.S. Pat. No. 5,480,214 discloses a side dump trailer which can dump materials from either side of the trailer. However, the pivoting mechanism of the Rogers trailer includes several deficiencies.

For example, although the pivoting mechanism of the Rogers trailer permits side dumping from either side of the trailer, the operator must exit the cab of the towing vehicle and disengage the J-shaped slides which permit the trailer body to pivot to the right or the left of the trailer to discharge its load. After the load is dumped, he must then exit again and re-engage the J-shaped slides to secure the containment vessel to the trailer for transport.

Also, the pivoting mechanism of the Rogers trailer and the pivoting mechanism of the directional side dump trailer of Golden, U.S. Pat. No. 5,597,211, rotate the containment vessel about a singular pivot axis. This is done both during the dumping cycle when dumping either right or left, and during the containment vessel's return to the transport position.

This singular pivot axis must be located at a point a significant distance from the containment vessel's axial centerline. This must be done in order to provide a geometric configuration which will allow the load to be dumped at a distance which will eliminate interference of the solid materials with the transport of the trailer. Several other deficiences are created by this singular pivot axis.

Owing to the fact that this singular pivot axis is a significant distance from the centroidal axis of the containment vessel, the initial force necessary to lift the load to start the dumping process as well as the force necessary to rotate the containment vessel back to its transport position after dumping, are greatly increased. This configuration also creates instability. This occurs as a result of the high arc and resulting leverage created by the containment vessel as it rotates about the singular pivot axis with a significant moment arm.

The resultant forces generated by this increased moment arm, both during the dumping phase when the containment vessel is loaded and upon its return to the transport position, induce an extreme amount of stress and wear on the pivot pins and their rests. They also place undue stress on the hydraulic lift cylinders and their pins. They can also result in damage to the containment vessel due to the excessive torsional stresses which are generated, especially if the containment vessel is loaded unevenly from front to back.

Another problem is created due to the fact that the singular pivot axis must also be positioned relatively low on the containment vessel to allow for proper dumping.

Since this singular pivot point is located so low, with respect to the containment vessel, the pivots themselves provide for very little, if any, support for the upper portions of the sidewalls of the containment vessel during the dumping operation and during its return to the normal transport position.

In addition, since the containment vessel is rotated about this singular pivot axis with such a high arc, and this arc is generated during the entirety of its dumping operation, this configuration does not allow for any additional structuring. This additional structuring could be affixed to the trailer frame, if so desired, and can be used to provide additional support at a higher point on the sidewalls of the containment vessel. This structuring can be used to provide additional support for the containment vessel towards its forward and rearward ends, as well as along the length of the containment vessel. This additional support would be most helpful both during the dumping operation and during the containment vessel's return to the normal transport position.

Rotational deficiencies such as these were overcome to some extent by Merritt, U.S. Pat. No. 4,289,353, through the use of sequential pivoting, although this concept was applied on an earlier combination belly dump/end dump vehicle which provided no provision for securely latching the subsequent pivoting elements during dumping.

OBJECTS AND ADVANTAGES

It is therefore a principal object of the invention to provide a sequential pivoting mechanism for side dump trailers and similar side dumping containment vessel transporting vehicles.

A further object of the invention is to provide a sequential pivoting mechanism which will enable the contents of the affixed containment vessel to be dumped from either side thereof.

Still another object of the invention is to provide a sequential pivoting mechanism which is capable of being remotely controlled and will release said mechanism's initial pivot pins, which are affixed to the containment vessel, selectively on either the right or the left side, so as to allow said containment vessel, when actuated upon by the lifting means, to rotate and dump its load to the side opposite that of the released initial pivot pins. This may be done without the operator having to exit the cab of the towing vehicle.

Still another object of the invention is to provide a sequential pivoting mechanism which is capable of being remotely controlled and will securely retain said mechanism's initial pivot pins, which are affixed to the containment vessel, to the trailer after it has dumped its load and has returned to the normal transport position. This can be done without the operator having to exit the cab of the towing vehicle.

Still another object of the invention is to provide a sequential pivoting mechanism which will allow the affixed containment vessel to dump the material therein sufficiently outwardly of the trailer so as to prevent the dumped materials from interferring with the operation of the trailer.

A further object of this invention is to provide a sequential pivoting mechanism that will cause the affixed containment vessel to rotate sufficiently to enable all of the contents held within said containment vessel to be dumped therefrom.

Still another object of the invention is to provide a sequential pivoting mechanism which allow the affixed containment vessel to be initially pivoted upon a near point and subsequently pivoted upon a far point such that the work performed by the lifting means is substantially less than would be required to pivot said containment vessel about a singular pivot axis.

Still another object of the invention is to provide a sequential pivoting mechanism which will allow the affixed containment vessel and the load to be pivoted closer to said containment vessel's center of gravity; doing so both during the dumping operation and during the containment vessel's return to the transport position. This will greatly increase stability, while at the same time substantially reducing the frictional and torsional stresses which can induce wear on the pivot pins and their rests. It will also help reduce wear on the hydraulic lift cylinders and their pins. It will also decrease the possibility of damage caused to the containment vessel by elevated frictional and torsional stresses, especially if the containment vessel is loaded unevenly from front to back.

Yet another object of the invention is to provide a sequential pivoting mechanism which will allow the containment vessel to rotate without such a high arc. This will provide an improved geometric configuration which will allow for additional structuring which can be affixed to the trailer frame, if so desired, and can be used to provide support at a higher point on the sidewalls of the containment vessel. This structuring can be positioned to provide additional support for the containment vessel towards it's forward and rearward ends. It can also be used to provide support for the containment vessel along it's length. This additional support would be most helpful both during the dumping operation and also during the containment vessel's return to the normal transport position.

Still another object of the invention is to provide a sequential pivoting mechanism which will securely, yet pivotally, retain said mechanism's subsequent pivot pins as the affixed containment vessel is moved rotatably about them.

Further objects and advantages of this invention will become apparent from a consideration of the drawings and the ensuing description.

DESCRIPTION OF THE PREFERRED EMBODIMENT

Figure 1:
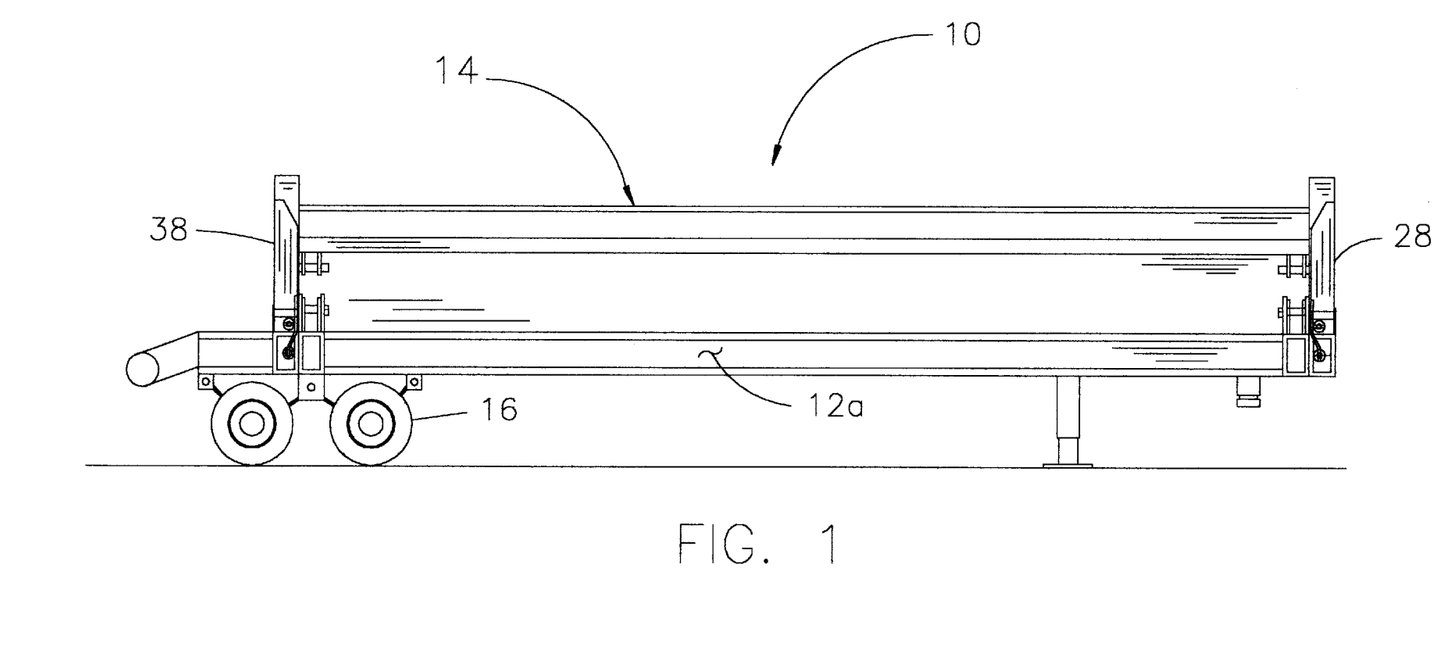
FIG. 1 is a right side elevation view of a typical side dump trailer with the sequential pivoting mechanism of the present invention affixed thereto.

Referring to FIG. 1 is shown a conventional side dump trailer 10, which has undergone the slight alterations necessary to incorporate the sequential pivoting mechanism of the present invention. The present invention is shown annexed and affixed thereto. These alterations will be described in more detail hereinafter.

In as much as certain elements common to the prior art necessarily co-operate with the present invention and are necessary to facilitate a complete understanding of said invention, the trailer 10, is shown to retain the usual containment vessel 14, two longitudinal frame rails 12a and 12b (not shown in FIG. 1), wheels 16 and front and rear lift cylinders 28 and 38, respectively.

For purposes of description and to provide clarity hereinafter, left will be understood to pertain to everything which is left of an imaginary vertical centerline created as the reader stands directly behind the trailer and looks forward.

Figure 2:
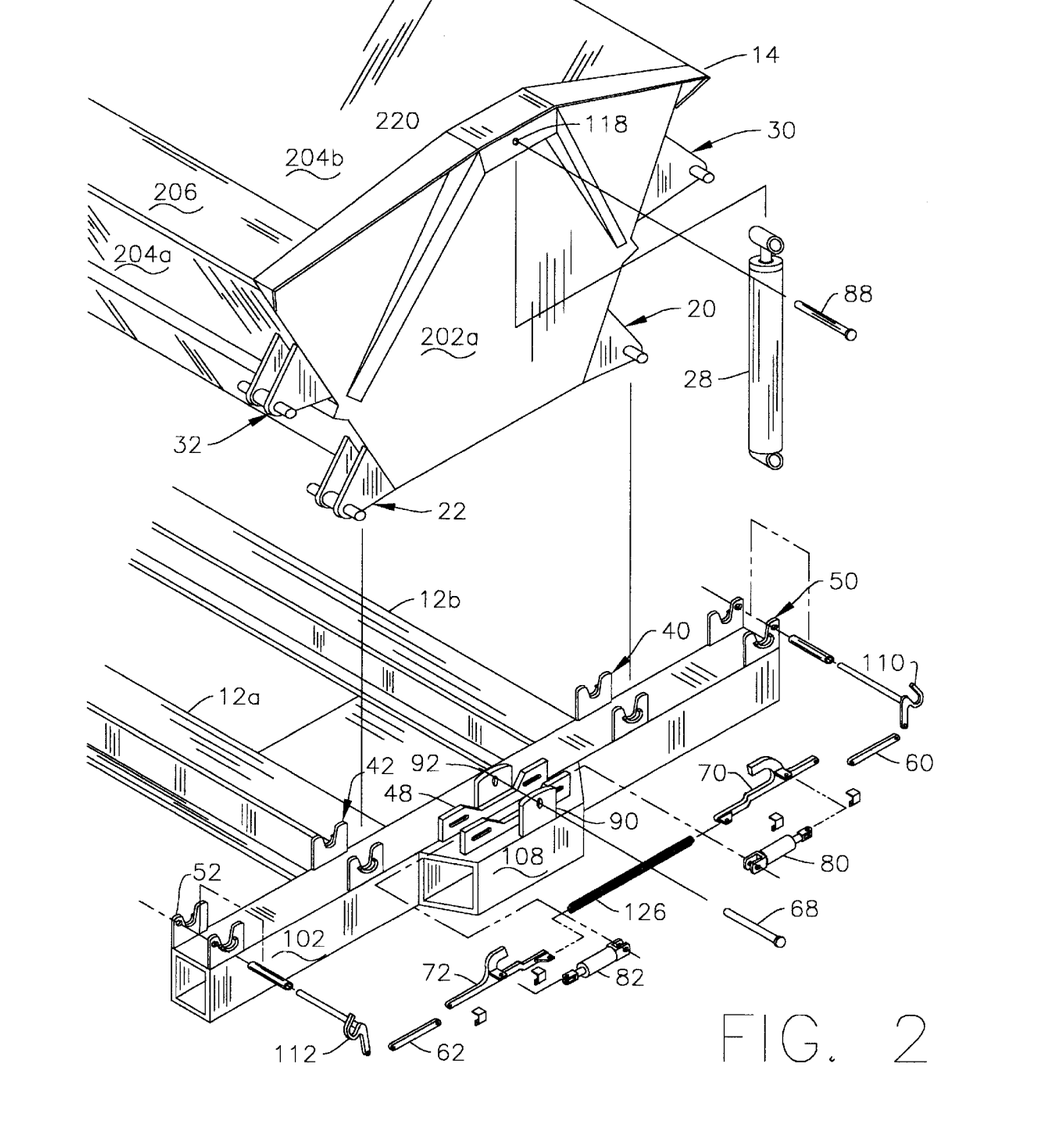
FIG. 2 is a front exploded perspective view of a typical side dump trailer, incorporating the sequential pivoting mechanism of the present invention.
Figure 3:
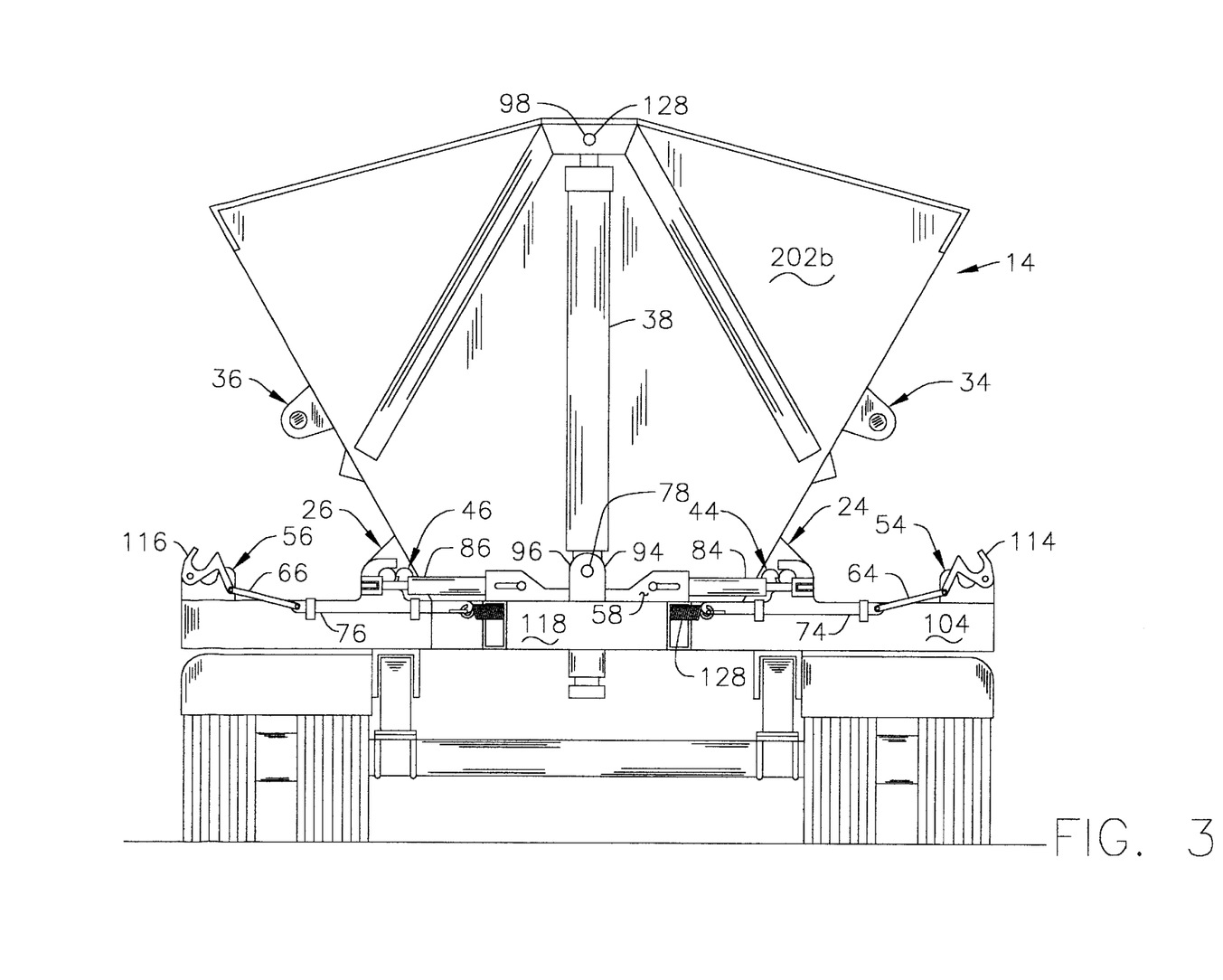
FIG. 3 is a rear elevation view of a typical side dump trailer in the normal transport position with the sequential pivoting mechanism of the present invention affixed thereto.

Referring to FIGS. 2 and 3, a front containment vessel support beam 102, and a rear containment vessel support beam 104, are shown. They are positioned parallel to one another at opposite ends of longitudinal frame rails 12a and 12b, and are centered perpendicularly and affixed thereto. Said containment vessel support beams 102 and 104, whose extended length is believed to be unique, are preferably constructed of rectangular or square steel tubing. This tubing must have sufficient wall thickness to provide a structure with enough stiffness to support a fully loaded containment vessel 14, as it is rotated about a point which lies very close to the containment vessel support beams' 102 and 104 extreme outer ends.

These front and rear containment vessel support beams 102 and 104 replace the shorter front and rear bulkheads of the trailer frame which are typical of the prior art.

The containment vessel 14 is shown to have a front wall 202a and a rear wall 202b, opposite sides 204a and 204b, a bottom wall 206, and an open upper end 220.

The containment vessel 14 has had its singular pivot rocker assemblies removed and each has been replaced by two separate rocker assemblies. These rocker assemblies will be referred to hereinafter as initial pivot pin assemblies and subsequent pivot pin assemblies. They will be described in more detail in the following text.

Initial pivot pin assembly 20 is affixed adjacent to the left sidewall of containment vessel 14 at its lower forward end.

Initial pivot pin assembly 22 is affixed adjacent to the right sidewall of containment vessel 14 at its lower forward end.

Initial pivot pin assembly 24 is affixed adjacent to the right sidewall of containment vessel 14 at its lower rearward end.

Initial pivot pin assembly 26 is affixed adjacent to the left sidewall of containment vessel 14 at its lower rearward end.

These initial pivot pin assemblies 20, 22, 24, and 26, are affixed to the containment vessel-14 in a manner which will place the elongated pivot pins of each parallel to the length of containment vessel 14.

When the trailer is in the normal transport position these initial pivot pin assemblies 20, 22, 24, and 26, rest pivotably in initial pivot pin receivers 40, 42, 44, and 46 respectively. These initial pivot pin receivers are affixed atop the front and rear containment vessel support beams 102 and 104.

A slidably mounted locking device is associated with each initial pivot pin receiver 40, 42, 44, and 46. These devices will be referred to hereinafter as initial pivot pin slider locks 70, 72, 74, and 76 respectively.

Initial pivot pin slider locks 70 and 72 are retained in a normally locked position by a tension spring 126, and are connected to hydraulic cylinders 80 and 82, respectively.

The opposite ends of hydraulic cylinders 80 and 82 are retained slidably by pins in slotted mount 48. This mount is affixed atop of and centered upon cylinder mount pedestal 108.

Lift cylinder plate 92, along with lift cylinder plate 90 and pin 68 pivotably retain the lower end of lift cylinder 28. Lift cylinder 28 is held in a sandwiched condition atop of and centered upon cylinder mount pedestal 108. Cylinder mount pedestal 108 is centered and affixed adjacent to the forward surface of front containment vessel support beam 102.

The rod end of lift cylinder 28 is pivotably connected to the upper end of the front wall 202a of containment vessel 14 at 118 by means of a pin 88.

Initial pivot pin slider locks 74 and 76 are retained in a normally locked position by a tension spring 128 and are connected to hydraulic cylinders 84 and 86 respectively.

The opposite ends of hydraulic cylinders 84 and 86 are retained slidably by pins in slotted mount 68. This mount is affixed atop of and centered upon cylinder mount pedestal 118.

Lift cylinder plate 96, along with lift cylinder plate 94 (not shown) and pin 78, pivotably retain the lower end of lift cylinder 38. Lift cylinder 38 is held in a sandwiched condition atop of and centered upon cylinder mount pedestal 118. Cylinder mount pedestal 118 is centered and affixed adjacent to the rearward surface of rear containment vessel support beam 104.

The rod end of lift cylinder 38 is pivotably connected to the upper end of the rear wall 202b of containment vessel 14 at 128 by means of a pin 98.

Figure 4:
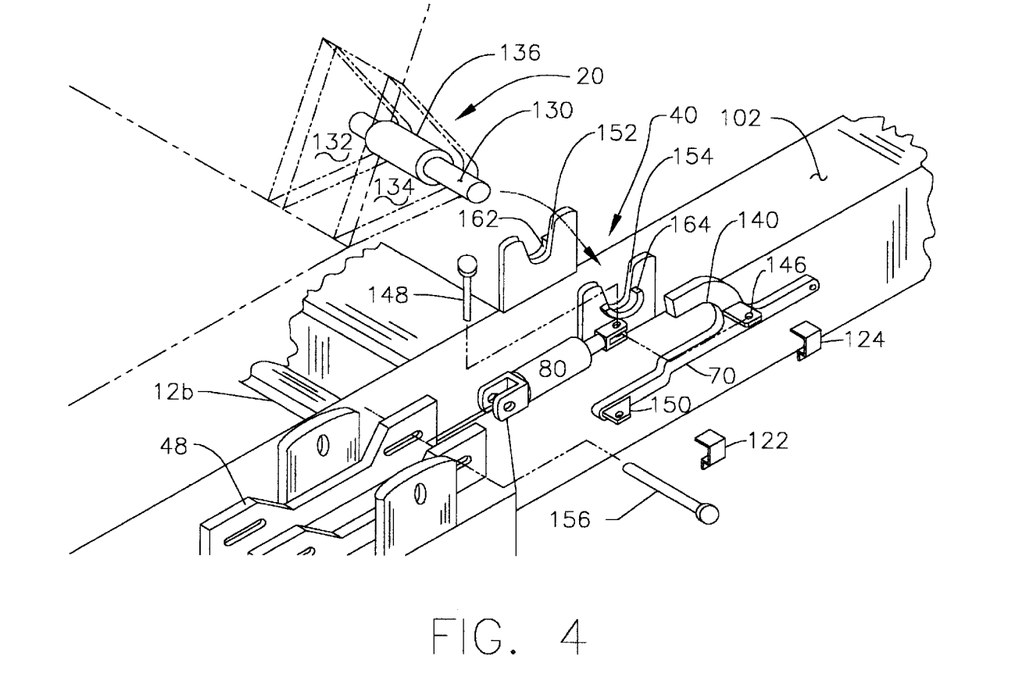
FIG. 4 is an exploded perspective view showing one initial pivot pin assembly, one initial pivot pin receiver, one initial pivot pin slider lock, one hydraulic cylinder and its mount.

In as much as initial pivot pin assemblies 20, 22, 24, and 26 are identical and are retained in a similar manner in their respective initial pivot pin receivers, by their respective initial pivot pin slider locks, which are actuated upon by their respective hydraulic cylinders in an identical manner, only initial pivot pin assembly 20, initial pivot pin receiver 40, initial pivot pin slider lock 70 and hydraulic cylinder 80, along with its slotted mount 48, will be described in detail and is shown in FIG. 4.

Referring now to FIG. 4, initial pivot pin assembly 20 is shown to include a pair of plates 132 and 134 in a spaced apart condition.

Initial pivot pin 130 is secured to plates 132 and 134, and has its opposite ends extending outwardly of plates 132 and 134. Bushing 136 is mounted on initial pivot pin 130 between plates 132 and 134.

Initial pivot pin receiver 40 is secured atop the front containment vessel support beam 102. It is positioned below initial pivot pin assembly 20 and includes a pair of spaced apart plates 142 and 144. These plates 142 and 144 are provided with recesses or cut out portions 152 and 154. U-shaped members 162 and 164 are welded to the outer surfaces of plates 142 and 144, respectively, at the lower ends of 152 and 154.

When initial pivot pin assembly 20 is positioned on initial pivot pin receiver 40, plates 132 and 134 are received between plates 142 and 144. The outer end portions of initial pivot pin 130 rest in the lower ends of the recesses 152 and 154 and in the U-shaped members 162 and 164.

Initial pivot pin slider lock 70 includes an arm portion 138 and a hook portion 140. It is retained slidably, adjacent to the forward face created by the conjunction of front containment vessel support beam 102 and plate 144 by brackets 122 and 124. Initial pivot pin slider lock 70 is provided with a tab 150 which is used to provide an attaching point for tension spring 126.

Hydraulic cylinder 80 is attached pivotably to initial pivot pin slider lock 70 by a tab 120, which is affixed to said slider lock and is provided with a hole 146 to accept a pin 148.

Hydraulic cylinder 80, which has a critical stroke and body length, has its opposite end retained slidably by a pin 156 in a slotted mount 48. This allows said cylinder a limited amount of longitudinal movement.

The critical stroke and body length of hydraulic cylinder 80 and the necessity for it being retained in a slotted mount will be described in more detail hereinafter.

Referring again to FIGS. 2 and 3, are shown links 60, 62, 64, and 66. These are attached pivotably to the outward ends of initial pivot pin slider locks 70, 72, 74, and 76, respectively, by means of a pin or a bolt.

The opposite ends of links 60, 62, 64, and 66 are attached pivotably to subsequent pivot latches 110, 112, 114, and 116, respectively, by means of a pin or a bolt.

Subsequent pivot latches 110, 112, 114, and 116 are each affixed to a shaft and are retained pivotably in subsequent pivot pin receivers 50, 52, 64, and 56, respectively.

Subsequent pivot pin receivers 50 and 52 are affixed atop the front containment vessel support beam 102 at the beam's extreme outboard ends. They are positioned equal distances from the trailer's axial centerline.

In the same manner, subsequent pivot pin receivers 54 and 56 are affixed atop rear containment vessel support beam 104.

Subsequent pivot pin assemblies 30, 32, 34, and 36 are positioned upwardly of, and in line with initial pivot pin assemblies 20, 22, 24, and 26 respectively.

Each subsequent pivot pin assembly is positioned upwardly of its respective initial pivot pin assembly in a manner which will place the elongated pivot pins of each parallel to the length of containment vessel 14. They are each affixed at a point on the sidewalls of containment vessel 14 which will create a center to center distance with respect to each pair of initial and subsequent pivot pins, which is equal to the center to center distance of the U-shaped recesses of each pair's associated pivot pin receivers.

In as much as subsequent pivot pin assemblies 30, 32, 34, and 36 are identical and are retained similarly when necessary in their respective subsequent pivot pin receivers by their respective subsequent pivot latches, which actuate their respective links in an identical manner, only subsequent pivot pin assembly 30, subsequent pivot pin receiver 60, subsequent pivot pin latch 110 and link 60 will be described in detail and shown in FIG. 5.

Figure 5:
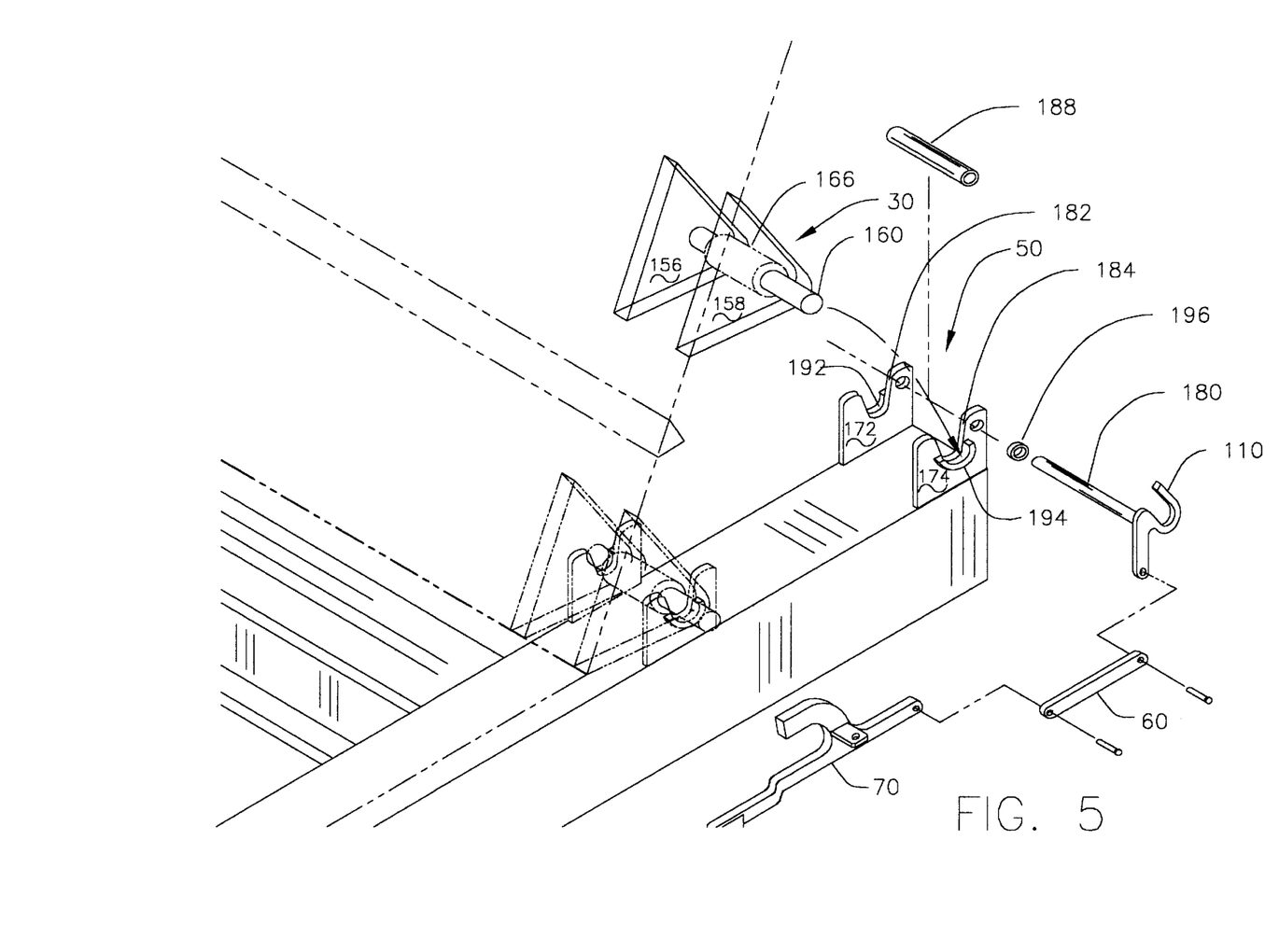
FIG. 5 is an exploded perspective view showing one subsequent pivot pin assembly, one subsequent pivot pin receiver, one subsequent pivot latch and one link.

Referring to FIG. 5, is shown subsequent pivot pin assembly 30, which is shown to include a pair of spaced apart plates 156 and 158.

Subsequent pivot pin 160 is secured to plates 156 and 158 and has its opposite ends extending outwardly of plates 156 and 158. Bushing 166 is mounted on subsequent pivot pin 160 between plates 156 and 158.

Subsequent pivot pin receiver 50 includes a pair of spaced apart plates 172 and 174. These plates are provided with recesses or cut out portions 182 and 184.

U-shaped members 192 and 194 are welded to the outer surfaces of plates 172 and 174, respectively, at the lower ends of recesses 182 and 184.

When subsequent pivot pin assembly 30 is positioned on subsequent pivot pin receiver 50, plates 156 and 158 are received between plates 172 and 174. The outer end portions of subsequent pivot pin 160 rest in the lower ends of the recesses 182 and 184, and in the U-shaped members 192 and 194.

Plates 172 and 174 are provided with cylindrical openings for pivotably accepting shaft 180. Shaft 180 extends outwardly from subsequent pivot latch 110 and is affixed thereto. Subsequent pivot latch 110 is retained in the proper lateral orientation by a bushing 188 and a spacer 196 which are affixed to shaft 180. Bushing 188 is held in a sandwiched condition between plates 172 and 174.

Link 60 is attached pivotably to the lower end of subsequent pivot latch 110 by use of a pin or a bolt. Link 60 is attached pivotably on its opposite end to initial pivot pin slider lock 70, by use of a pin or a bolt.

Figure 6:
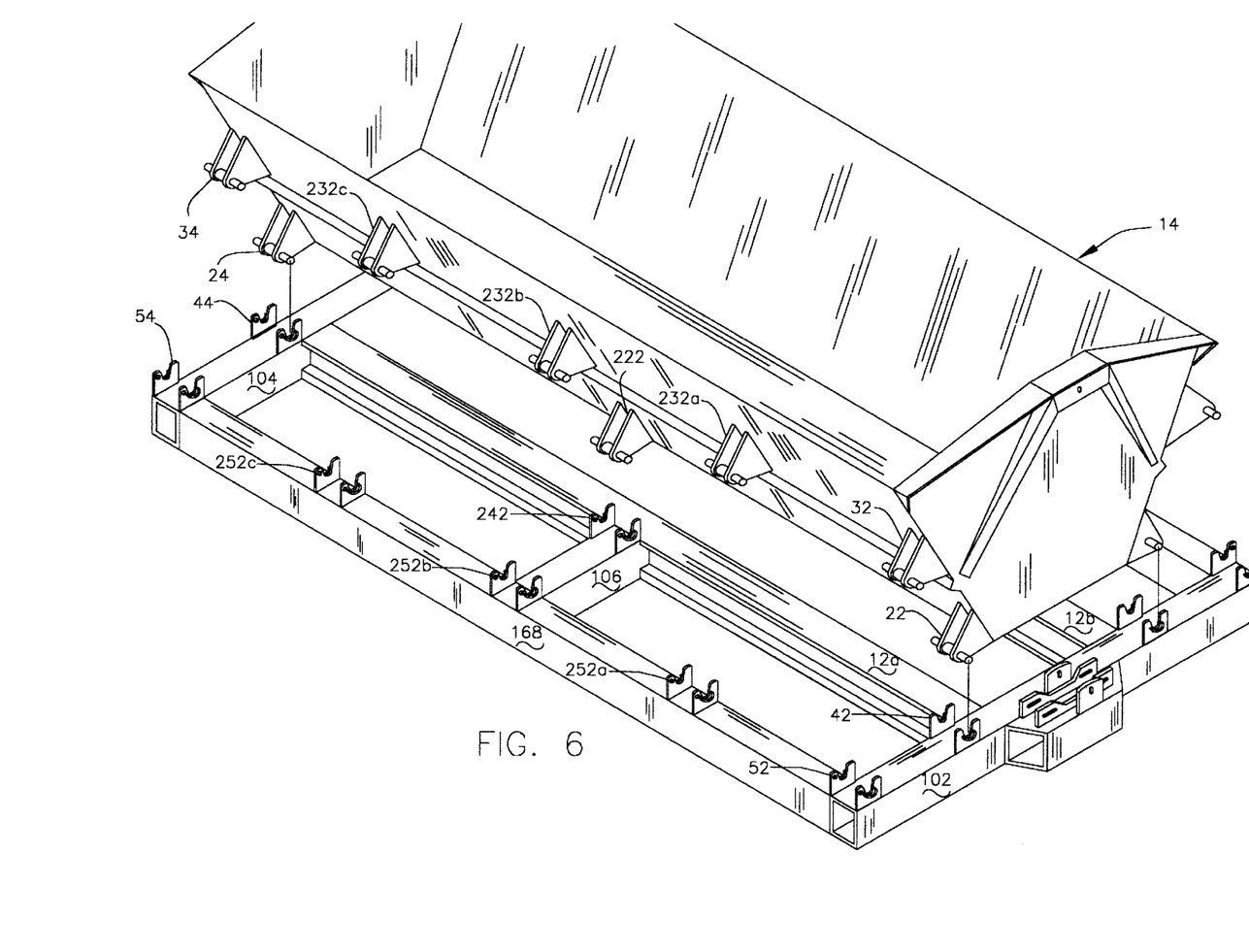
FIG. 6 is a front perspective view showing an example of how additional structuring can be used to enhance the present invention.

FIG. 6 is provided to show the reader an example of how the improved geometric configuration of the present invention allows for the implementation of additional structuring. This structuring can be affixed to the longitudinal frame rails 12a and 12b, and/or the front and rear containment vessel support beams 102 and 104, respectively. This structuring can be employed, if it is desired to do so, to provide additional support for the containment vessel 14. This additional support would be most useful both during the dumping operation and during the return of the containment vessel 14 to its normal transport position. Although FIG. 6 shows just one example of how additional structuring can be used to enhance the present invention, it should be understood that many alternate variations and combinations of additional structuring and support can be employed.

For purposes of description and to provide clarity, some elements of the present invention are not shown in FIG. 6.

Also, in as much as any additional structuring and support would most likely be affixed to the vehicle in a symetrical fashion, the additional structuring and support affixed to the right side of the vehicle only, will be described in detail.

FIG. 6 shows the addition of a runner 168, which is positioned parallel to the length of the containment vessel 14. Runner 168 is affixed adjacent to the rearward and forward surfaces of front and rear containment vessel support beams 102 and 104, respectively, at their extreme outer ends. A short beam 106 is centered and affixed adjacent to both the inward surface of runner 168 and the outward surface of longitudinal frame rail 12a. Affixed atop of short beam 106 is an additional initial pivot pin receiver 242 which is devoid of any pivot pin retaining elements. This additional initial pivot pin receiver 242 is positioned centered between and in the same orientation as initial pivot pin receivers 42 and 44. An additional initial pivot pin assembly 222 is affixed to the sidewall of containment vessel 14 and is centered between and in the same orientation as initial pivot pin assemblies 22 and 24. Additional subsequent pivot pin receivers 252a, 252b, and 252c are positioned atop of runner 168 and are also devoid of their pivot pin retaining elements, and are positioned between and in the same orientation as subsequent pivot pin receivers 52 and 54. Three additional subsequent pivot pin assemblies 232a, 232b, and 232c are affixed to the right sidewall of containment vessel 14. These additional subsequent pivot pin assemblies are positioned between and in the same orientation as subsequent pivot pin assemblies 32 and 34. They are positioned as to coincide with subsequent pivot pin receivers 252a, 252b, and 252c, respectively, when the containment vessel 14, is rotated over onto it's right side, into the subsequent pivot position.

The most significant support for the sidewalls of containment vessel 14 would be provided at this point. This support would be created as the pivot pin assemblies, whether rotating within, or resting upon their associated subsequent pivot pin receivers will help to counteract the stresses imposed upon the sidewalls of containment vessel 14, especially along it's length, which can have a tendency to bow or twist said sidewalls. This is true especially if containment vessel 14 is not loaded evenly from front to back, when the dumping operation is taking place.

Operation

Referring to FIGS. 2 and 3, when it is desired to haul materials, containment vessel 14 is retained in the normal transport position by initial pivot pin slider locks 70, 72, 74, and 76. These slider locks are held positioned over the exposed outer ends of the pivot pins of initial pivot pin assemblies 20, 22, 24, and 26, respectively, by tension springs 126 and 128. This is done as initial pivot pin assemblies 20, 22, 24, and 26 rest in their respective initial pivot pin receivers 40, 42, 44, and 46.

When the trailer has arrived at the location where the material is to be dumped, the driver will determine which side the material is to be dumped to.

Assuming the material is to be dumped to the right side of the trailer, hydraulic cylinders 80 and 86, which are fluidly interconnected, in such a manner as to cause them to work in unison; and are connected to a source of hydraulic fluid under pressure, which can be controlled remotely by the use of valving from within the cab of the towing vehicle, are simultaneously extended and force initial pivot pin slider locks 70 and 76 outwardly. This motion continues until hydraulic cylinders 80 and 86 have reached the limits of their extended stroke lengths. This outward motion of initial pivot pin slider locks 70 and 76 allows for the eventual release of the pivot pins of initial pivot pin assemblies 20 and 26.

The hydraulic fluid, which is still under pressure, holds hydraulic cylinders 80 and 86 in this outward position and is then diverted or bypassed from hydraulic cylinders 80 and 86 simultaneously into the lower ends of front and rear lift cylinders 28 and 38, respectively. As the rods of front and rear lift cylinders 28 and 38 extend from their respective cylinders, upward force is applied to the upper central portion of containment vessel 14. Continued upward movement of the rods of the front and rear lift cylinders 28 and 38 causes the containment vessel 14 to pivot about the pivot pins of initial pivot pin assemblies 22 and 24.

In other words, the initial pivot pin assemblies 22 and 24 pivotally move with respect to their associated initial pivot pin receivers 42 and 44.

As the front and rear lift cylinders 28 and 38 are extended, the initial pivot pin assemblies 20 and 26 raise upwardly out of engagement with their associated initial pivot pin receivers 40 and 46.

Front and rear lift cylinders 28 and 38 continue to extend and rotate the containment vessel 14 pivotally about initial pivot pin assemblies 22 and 24. This motion continues without impediment until the pivot pins of subsequent pivot pin assemblies 32 and 34 come in contact with subsequent pivot pin latches 112 and 114, respectively.

Figure 7:
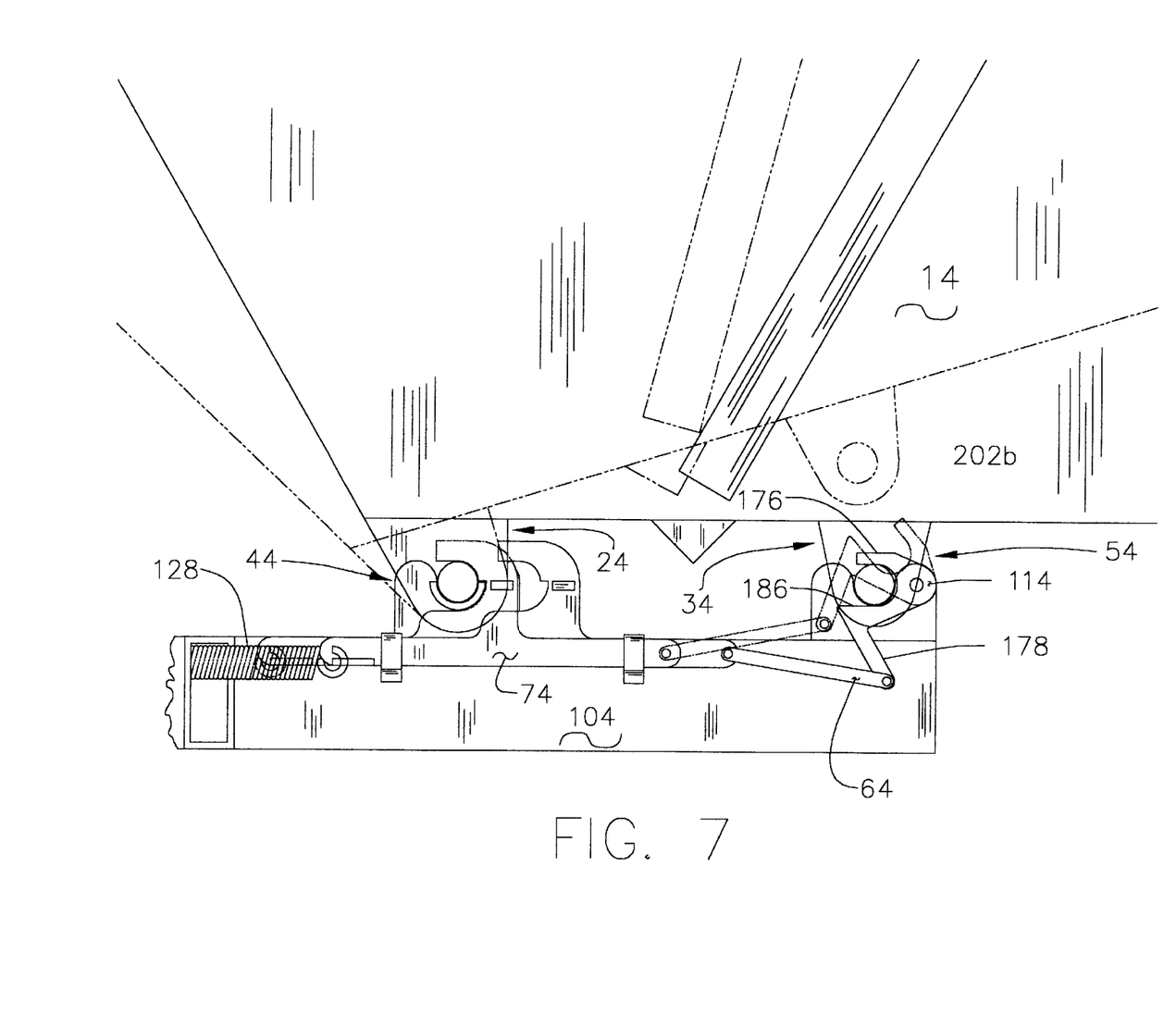
FIG. 7 is a partial rear elevation view showing the interaction between a subsequent pivot pin assembly and a subsequent pivot latch and its effect on their associated elements.

FIG. 7 is provided to show the before and after effects caused by the pivot pin of subsequent pivot pin assembly 34 coming into contact with subsequent pivot latch 114.

It should be understood that at the same time that the pivot pin of subsequent pivot pin assembly 34 is contacting subsequent pivot latch 114, causing it to interact with its attached elements; the pivot pin of subsequent pivot pin assembly 32 is contacting subsequent pivot latch 112, causing it to interact with its attached elements in an identical manner. It is this contact and interaction which allows the present invention to provide the transition from initially pivoting the containment vessel 14 upon a near point, to subsequently pivoting the containment vessel 14 upon a far point.

Refering now to FIG. 7, the phantom lines in FIG. 7, are used to show the position of the elements just prior to the pivot pin of subsequent pivot pin assembly 34 coming into contact with subsequent pivot latch 114. The containment vessel 14 is still being initially pivoted about the pivot pin of initial pivot pin assembly 24. This is taking place as the pivot pin of initial pivot pin assembly 24 is still being retained pivotably within initial pivot pin receiver 44, by initial pivot pin slider lock 74.

The solid lines shown in FIG. 7 show the position of these elements after the pivot pin of subsequent pivot pin assembly 34 has made contact with subsequent pivot latch 114 and has come to rest within subsequent pivot pin receiver 54. As can be seen, the pivot pin of subsequent pivot pin assembly 34 has become pivotably retained by subsequent pivot latch 114. This has occurred as a result of the pivot pin of subsequent pivot pin assembly 34 coming into contact with the lobe shaped portion 186 of subsequent pivot latch 114. This contact has caused subsequent pivot latch 114 to rotate allowing it's hook shaped portion 176 to surround and pivotably retain the pivot pin of subsequent pivot pin assembly 34. This force has also caused the arm portion 178 of subsequent pivot latch 114 to rotate placing link 64 in tension. This force is then transmitted to initial pivot pin slider lock 74 causing it to be pulled outwardly. The containment vessel 14 is now capable of being subsequently pivoted.

Referring again to FIG. 2 and 3, the rods of lift cylinders 28 and 38 continue to extend and rotate the containment vessel about the pivot pins of subsequent pivot pin assemblies 32 and 34. This continued rotation causes the pivot pins of initial pivot pin assemblies 22 and 24 to pull upwardly. This motion pulls them out of engagement with their associated initial pivot pin receivers 42 and 44. The containment vessel 14 continues to rotate about the pivot pins of subsequent pivot pin assemblies 32 and 34. This motion continues until the front and rear lift cylinders 28 and 38 have reached the extents of their stroke lengths and the dumping operation is completed, as can be seen in FIG. 8.

Figure 8:
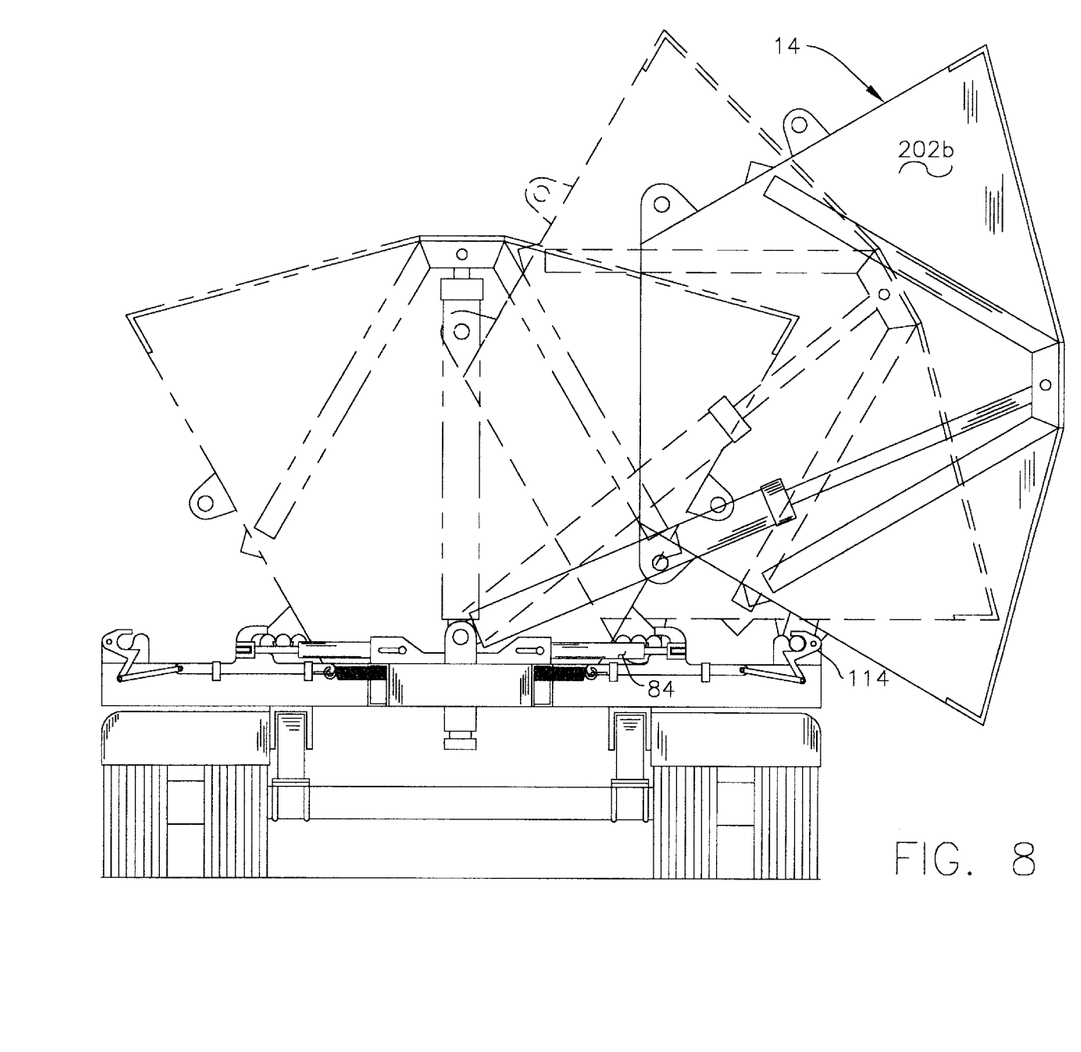
FIG. 8 is a partial rear elevation view showing the containment vessel in the three different phases of its side dump process.

FIG. 8 is also provided to show the reader the necessity for the small initial pivot pin slider lock actuating hydraulic cylinders being of an appropriate body and stroke length. It also demonstrates the necessity for them being retained within a slotted mount. Although not shown in FIG. 7 to allow the reader a clear vantage of the movement imposed upon initial pivot pin slider lock 74, this same movement has been transmitted to hydraulic cylinder 84 causing it to be moved outwardly as well. It is this outward motion which necessitates these small cylinders being of an appropriate body and stroke length as well as being retained within a slotted mount.

Once the dumping operation is completed and it is desired to return the containment vessel 14 to the normal transport position, the rods of lift cylinders 28 and 38 are retracted. This retraction causes the containment vessel 14 to rotate towards its normal transport position about subsequent pivot pin assemblies 32 and 34. The containment vessel 14 continues to rotate in this manner without impediment until the pivot pins of initial pivot pin assemblies 22 and 24 come to rest in their associated initial pivot pin receivers 42 and 44. As the lift cylinders 28 and 38 continue to retract, the containment vessel 14 now starts to rotate about the initial pivot pin assemblies 22 and 24. This rotational movement causes subsequent pivot pin assemblies 32 and 34 to pull upwardly and out of engagement with their respective subsequent pivot latches 112 and 114 and their respective subsequent pivot pin receivers 52 and 54. Subsequent pivot pin assemblies 32 and 34 are pulled upwardly and the weight is released off of their respective subsequent pivot latches 112 and 114. This allows initial pivot pin slider locks 72 and 74 to be drawn inwardly by tension springs 126 and 128. This inward motion of initial pivot pin slider locks 72 and 74 allows them to surround and pivotably retain the pivot pins of initial pivot pin assemblies 22 and 24. The containment vessel 14 continues to rotate pivotally about initial pivot pin assemblies 22 and 24. This is due to the continued retraction of the rods of lift cylinders 28 and 38. This continues until the containment vessel 14 comes to rest in the normal transport position. The containment vessel 14 is then secured in this position as the hydraulic fluid pressure that was holding hydraulic cylinders 80 and 86 in an outwardly extended position is released, thus allowing tension springs 126 and 128 to pull inwardly on initial pivot pin slider locks 70 and 76. This inward motion on initial pivot pin slider locks 70 and 76 draws their hook portions over the initial pivot pins of initial pivot pin assemblies 20 and 26.

When it is desired to dump the load to the opposite or left side, and return the containment vessel 14 back to the normal transport position, mechanically the procedures are similar. In as much as the side dump trailer 10 incorporates the sequential pivoting mechanism of the present invention in a manner which creates a vehicle that is symetrical with respect to said vehicle's vertical axial centerline, it shall be deemed readily apparent and obvious to one skilled in the art, that when it is desired to dump the load to the left side of the vehicle and return the containment vessel 14 back to the normal transport position, the procedures are the same as for dumping the load to the right side of the vehicle and returning the containment vessel 14 back to the normal transport position. This is true with the exception that the procedures are carried out by each elements corresponding symetrically opposite element, although in an identical chronological order.

CONCLUSION, RAMIFICATIONS AND SCOPE OF INVENTION

While my above description contains many specificities, these should not be construed as limitations on the scope of the invention, but rather as an exemplification of one preferred embodiment thereof.

Many other variations are possible. For example, although the drawings illustrate and the specifications describe the sequential pivoting mechanism of the present invention used on a side dump trailer which would probably be pulled by a truck having a fifth wheel, said mechanism could be mounted on any suitable containment vessel and trailer frame combination and could be pulled by any suitable towing vehicle, an example of which is a containment vessel and a flatbed style railcar combination which is pulled by a train engine or possibly a containment vessel and trailer frame combination which is pulled by a tractor to move materials from one place to another around the farm.

Also, in as much as the present invention provides an improved geometric configuration which creates increased stability, the possibility exists for major portions of the vehicle to be constructed from a lighter gauge of steel or possibly being constructed from an alternative metal alloy such as aluminum, titanium, magnesium, etc.

Another ramification which is conceivable is for the small lock actuating cylinders to be pnuematically actuated as opposed to hydraulically actuated. The feasibility of this variation would be determined for the most part by the size of the vehicle, in as much as a vehicle with a smaller containment vessel would require less holding force than a vehicle with a larger containment vessel.

I claim:

1. In a side dump trailer of the type comprising an elongated containment vessel having at least a front wall at its forward end, a rear wall at its rearward end, and first and second sidewalls which extend upwardly and outwardly from a bottom enclosure means to an open upper end for receiving materials to be transported, and is pivotably mounted upon a wheeled trailer frame by a pivoting mechanism which allows said containment vessel, having interior and exterior surfaces and having its said first sidewall on one side thereof, and its said second sidewall on the other side thereof, to be selectively dumped by hydraulic means to either side thereof, a sequential pivoting mechanism for side dump trailers wherein the improvement comprises:

at least one forward and one rearward elongated support beam of substantial length positioned perpendicularly with respect to spaced apart longitudinal members of said frame and affixed thereto so as to become an integral part thereof, and having their ends projecting outwardly therefrom at equal distances;

a first pivot pin receiver mounted atop said forward support beam, said first pivot pin receiver of said forward support beam inwardly positioned a predetermined distance from the midpoint of said forward support beam's length on said one side thereof;

a second pivot pin receiver mounted atop said forward support beam, said second pivot pin receiver of said forward support beam inwardly positioned a predetermined distance from the midpoint of said forward support beam's length on said other side thereof;

a first pivot pin receiver mounted atop said rearward support beam, said first pivot pin receiver of said rearward support beam inwardly positoned a predetermined distance from the midpoint of said rearward support beam's length on said one side thereof;

a second pivot pin receiver mounted atop said rearward support beam, said second pivot pin receiver of said rearward support beam inwardly positioned a predetermined distance from the midpoint of said rearward support beam's length on said other side thereof;

an outlying third pivot pin receiver mounted atop said forward support beam, said third pivot pin receiver of said forward support beam adjacent said one side thereof;

an outlying fourth pivot pin receiver mounted atop said forward support beam, said fourth pivot pin receiver of said forward support beam adjacent said other side thereof;

an outlying third pivot pin receiver mounted atop said rearward support beam, said third pivot pin receiver of said rearward support beam adjacent said one side thereof;

an outlying fourth pivot pin receiver mounted atop said rearward support beam, said fourth pivot pin receiver of said rearward support beam adjacent said other side thereof;

a first horizontally disposed pivot pin secured to the exterior surface of said first sidewall of said containment vessel adjacent the forward and bottom end thereof;

a second horizontally disposed pivot pin secured to the exterior surface of said second sidewall of said containment vessel adjacent the forward and bottom end thereof;

a first horizontally disposed pivot pin secured to the exterior surface of said first sidewall of said containment vessel adjacent the rearward and bottom end thereof;

a second horizontally disposed pivot pin secured to the exterior surface of said second sidewall of said containment vessel adjacent the rearward and bottom end thereof;

a third horizontally disposed pivot pin secured to the exterior surface of said first sidewall, adjacent the forward end thereof, positioned medially a predetermined distance between said forward first pivot pin and the open upper end of said containment vessel;

a fourth horizontally disposed pivot pin secured to the exterior surface of said second sidewall, adjacent the forward end thereof, positioned medially a predetermined distance between said forward second pivot pin and the open upper end of said containment vessel;

a third horizontally disposed pivot pin secured to the exterior surface of said first sidewall, adjacent the rearward end thereof, positioned medially between said rearward first pivot pin and the open upper end of said containment vessel;

a fourth horizontally disposed pivot pin secured to the exterior surface of said second sidewall, adjacent the rearward end thereof, positioned medially between said rearward second pivot pin and the open upper end of said containment vessel;

said containment vessel being pivotably mounted to said wheeled frame by releasable connection of each of said first and second forward pivot pins to a respective one of said first and second forward pivot pin receivers and releasable connection of each of said first and second rearward pivot pins to a respective one of said first and second rearward pivot pin receivers;

a first and a second forward releasable locking means, each mounted adjacent a respective one of said first and second forward pivot pin receivers, and a first and a second rearward releasable locking means each mounted adjacent a respective one of said first and second rearward pivot pin receivers for releasably securing said first and second forward and rearward pivot pins within a respective one of said forward and rearward pivot pin receivers;

a third and a fourth forward releasable locking means, each mounted adjacent a respective one of said third and fourth forward pivot pin receivers, and a third and a fourth rearward releasable locking means each mounted adjacent a respective one of said third and fourth rearward pivot pin receivers for releasably securing said third and fourth forward and rearward pivot pins within a respective one of said forward and rearward pivot pin receivers;

a first forward connection means to pivotably interconnect said first forward releasable locking means to said third forward releasable locking means;

a second forward connection means to pivotably interconnect said second forward releasable locking means to said fourth forward releasable locking means;

a first rearward connection means to pivotably interconnect said first rearward releasable locking means to said third rearward releasable locking means;

a second rearward connection means to pivotably interconnect said second rearward releasable locking means to said fourth rearward releasable locking means;

means for simultaneously selectively urging either said first forward and rearward releasable locking means or said second forward and rearward releasable locking means into their unlocked positions;

a first power cylinder having a base end pivotally secured to a forward hydraulic cylinder mount secured to a forward surface of said forward support beam intermediate the sides thereof forwardly of said containment vessel and a rod end secured to said front wall of said containment vessel intermediate the sides thereof;

a second power cylinder having a base end pivotally secured to a rearward hydraulic cylinder mount secured to a rearward surface of said rearward support beam intermediate the sides thereof rearwardly of said containment vessel and a rod end secured to said rear wall of said containment vessel intermediate the sides thereof;

and means for simultaneously selectively extending the rods of said first and second power cylinders whereby said containment vessel will be initially rotated to dump the material therein to said one side thereof when said first releasable locking means are in their locked positions and said second releasable locking means have been moved into their unlocked position by their urging means and subsequently rotated when said third releasable locking means have been moved into their locked position and said first releasable locking means have been moved into their unlocked position as a result of contact of said third pivot pins with said third releasable locking means, and whereby said containment vessel will be initially rotated to dump the material therein to said other side thereof when said second releasable locking means are in their locked positions and said first releasable locking means have been moved into their unlocked position by their urging means and subsequently rotated when said fourth releasable locking means have been moved into their locked position and said second releasable locking means have been moved into their unlocked position as a result of contact of said fourth pivot pins with said fourth releasable locking means.

2. The sequential pivoting mechanism of claim 1 wherein each of said third forward and rearward and said fourth forward and rearward releasable locking means includes a generally question mark shaped latch which is pivotably interconnected with a respective one of each of said first forward and rearward and said second forward and rearward releasable locking means.

3. The sequential pivoting mechanism of claim 2 wherein said latches of each of said third forward and rearward and said fourth forward and rearward releasable locking means are rotatably mounted adjacent its associated pivot pin receiver and are rotatably movable into engagement by contact from its associated pivot pin for rotatably maintaining said pivot pins and is rotatably movable out of engagement by lack of contact with its associated pivot pin for releasing said pivot pins.

4. The sequential pivoting mechanism of claim 3 wherein each of said third forward and rearward and said fourth forward and rearward releasable locking means is pivotably interconnected with a respective one of each of said first forward and rearward and said second forward and rearward releasable locking means whereby contact of said latches of said third forward and rearward releasable locking means by their associated pivot pins urges said first forward and rearward releasable locking means into their unlocked positions, and whereby contact of said latches of said fourth forward and rearward releasable locking means by their associated pivot pins urges said second forward and rearward releasable locking means into their unlocked positions.

5. The sequential pivoting mechanism of claim 3 wherein each of said third forward and rearward and said fourth forward and rearward releasable locking means is pivotably interconnected with a respective one of each of said first forward and rearward and said second forward and rearward releasable locking means whereby a lack of contact of said latches of said third forward and rearward releasable locking means by their associated pivot pins urges said first forward and rearward releasable locking means into their locked positions, and whereby a lack of contact of said latches of said fourth forward and rearward releasable locking means by their associated pivot pins urges said second forward and rearward releasable locking means into their locked positions.

* * * * *